US007803896B2

(12) United States Patent
Chen et al.

(10) Patent No.: US 7,803,896 B2
(45) Date of Patent: Sep. 28, 2010

(54) POLYIMIDE-TITANIA HYBRID MATERIALS, THEIR PREPARATION, AND FILM PREPARED FROM THE MATERIALS

(75) Inventors: Wen-Chang Chen, Taipei (TW); Hung-Wen Su, Taoyuan County (TW)

(73) Assignee: National Taiwan University, Taipei (TW)

( * ) Notice: Subject to any disclaimer, the term of this patent is extended or adjusted under 35 U.S.C. 154(b) by 434 days.

(21) Appl. No.: 11/979,981

(22) Filed: Nov. 13, 2007

(65) Prior Publication Data
US 2009/0092759 A1    Apr. 9, 2009

(30) Foreign Application Priority Data
Oct. 3, 2007    (TW) .............................. 96137064 A

(51) Int. Cl.
*C08G 69/08* (2006.01)
(52) U.S. Cl. ..................... 528/310; 528/353; 525/418; 427/384
(58) Field of Classification Search ................. 528/310, 528/353; 525/418; 427/384
See application file for complete search history.

(56) References Cited

OTHER PUBLICATIONS

K. G. Sharp, *Adv. Mater.*, 1998, 10, 1243.
H. Althues, J. Henle and S. Kaskel, *Chem. Sco. Rev.*, 2007, 36, 1454.
W. Caseri, *Macromol. Rapid Commun.*, 2000, 21, 705.
C. Lu, Z. Cui, Y. Wang, Z. Li, C. Guan, B. Yang and J. Shen, *J. Mater. Chem.*, 2003, 13, 2189.
C. Lu, C. Guan, Y. Liu, Y. Cheng and B. Yang, *Chem. Mater.*, 2005, 17, 2448.
T. Kyprianidou-Leodidou, H. J. Althaus, Y. Wyser, D. Vetter, M. Buchler, W. Caseri and U. W. Suter, *J. Mater. Res.*, 1997, 12, 2198.
W. C. Chen, L. H. Lee, B. F. Chen and C. T. Yen, *J. Mater. Chem.*, 2002, 12, 6344.
W. C. Chen, W. C. Liu, P. T. Wu and P. F. Chen, *Mater. Chem. Phys.*, 2004, 83, 71.
W. C. Chen, S. J. Lee, L. H. Lee and J. L. Lin, *J. Mater. Chem.*, 1999, 9, 2999.
L. H. Lee and W. C. Chen, *Chem. Mater.*, 2001, 13, 1137.
A. H. Yuwono, J. Xue, J. Wang, H. I. Elim, W. Ji, Y. Li and T. J. White, *J. Mater. Chem.*, 2003, 13, 1475.
H. I. Elim, W. Ji, A. H. Yuwono, J. M. Xue, J. Wang, *Appl. Phys. Lett.*, 2003, 82, 2691.
A. H. Yuwono, B. Liu, J. Xue, J. Wang, H. I. Elim, W. Ji, Y. Li and T. J. White, *J. Mater. Chem.*, 2004, 14, 2978.
A. H. Yuwono, J. Xue, J. Wang, H. I. Elim and W. Ji, *J. Elecroceram.*, 2006, 16, 431.
A. H. Yuwono, Y. Zhang, J. Wang, X. H. Zhang, H. Fan and W. Ji, *Chem. Mater.*, 2006, 18, 5876.
C. C. Chang and W. C. Chen, *J. Polym. Sci. Part A: Polym. Chem.*, 2001, 39, 3419.
C. M. Chang, C. L. Chang and C. C. Chang, *Macromol. Mater. Eng.*, 2006, 291, 1521.
P. C. Chiang and W. T. Whang, *Polymer*, 2003, 44, 2249.
M. Nandi, J. A. Conklin, L. Salvati and A. Sen, *Chem. Mater.*, 1991, 3, 201.
M. Camail, M. Humbert, A. Margaillan, A. Riondel and J. L. Vernet, *Polymer*, 1998, 39, 6525.
M. Camail, M. Humbert, A. Margaillan and J. L. Vernet, *Polymer*, 1998, 39, 6533.
F. X. Perrin, V. Nguyen and J. L. Vernet, *J. Sol-Gel Sci. Technol.*, 2003, 28, 205.
T. Matsuura, Y. Hasuda, S. Nishi and N. Tamada, Macromolecules, 1991, 24, 5001.

*Primary Examiner*—James Seidleck
*Assistant Examiner*—Gregory Listvoyb
(74) *Attorney, Agent, or Firm*—Bacon & Thomas, PLLC

(57) ABSTRACT

The present invention relates to polyimide-titania hybrid thin film, which possesses relatively good surface planarization, excellent thermal properties (400<Td<550° C.), tunable refractive index (1.571<n<1.993), and highly optical transparency in the visible range. The present invention also relates to a method for preparing the polyimide-titania hybrid materials, which comprises producing a polyimide containing pendent and/or terminal carboxylic acid, coordinating the carboxylic acid with titanium of titanium alkoxide and sol-gel reacting of titanium alkoxide, to enhance the interaction between polyimide and titania and produce the polyimide-titania hybrid materials without macrophase separation. The present polyimide-titania hybrid materials are useful to produce the thin film having the above features.

13 Claims, 9 Drawing Sheets

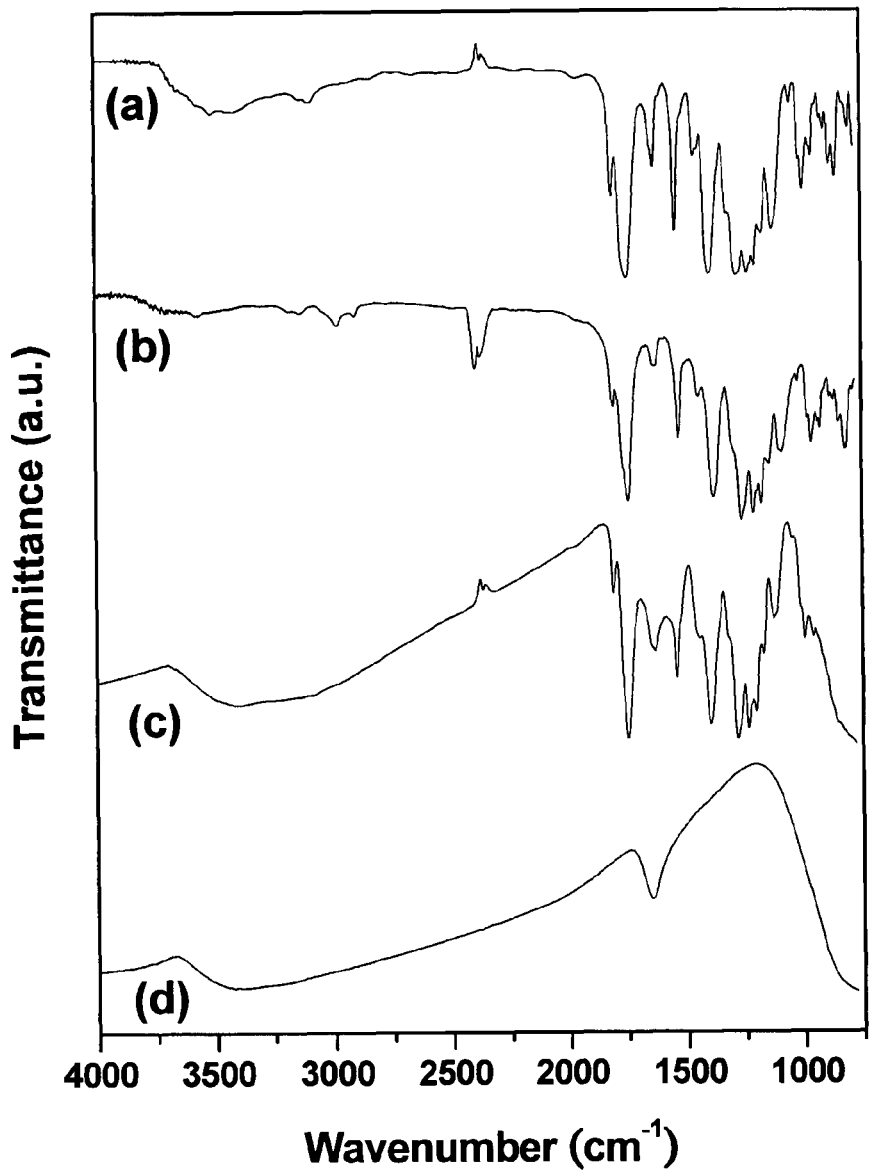
Fig. 1 FTIR spectra of the prepared: (a) 6FDA-6FpDA-4ABA, (b) 6FDA-6FpDA-Aniline, (c) TP50, and (d) TP100 hybrid films coated on silicon wafer.

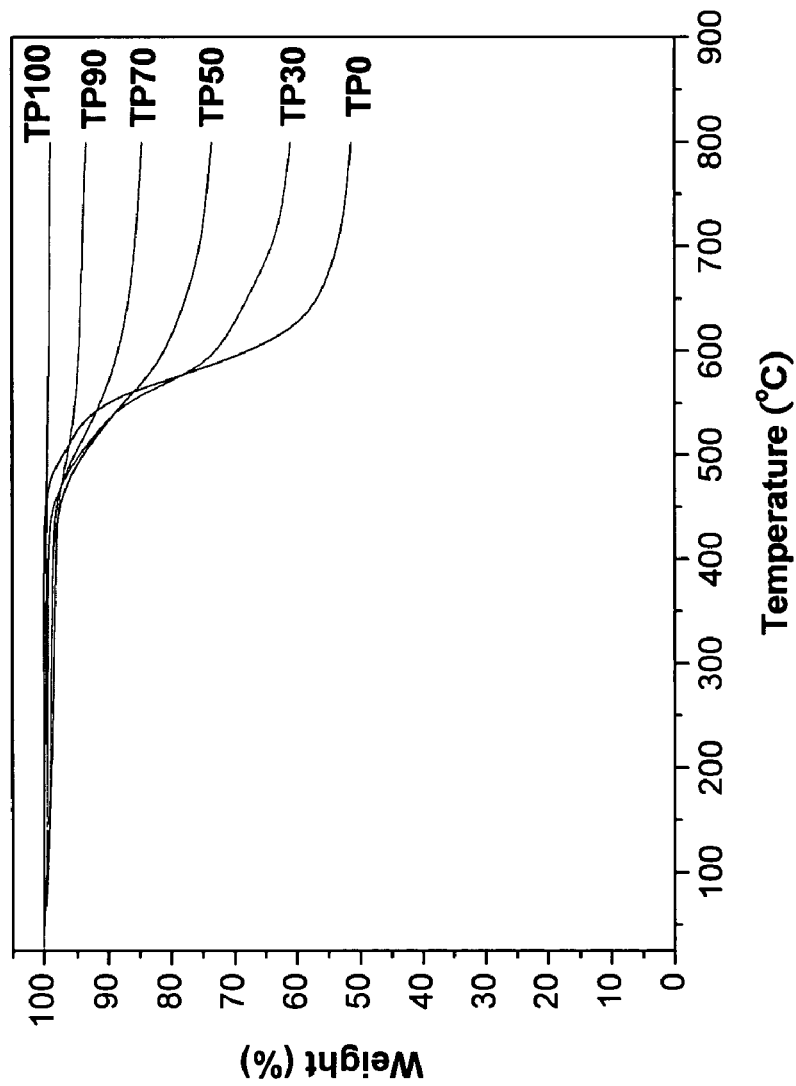
Fig. 2 TGA curves of the TP-series hybrid films at a heating rate of 10 °C min$^{-1}$ under a nitrogen flow.

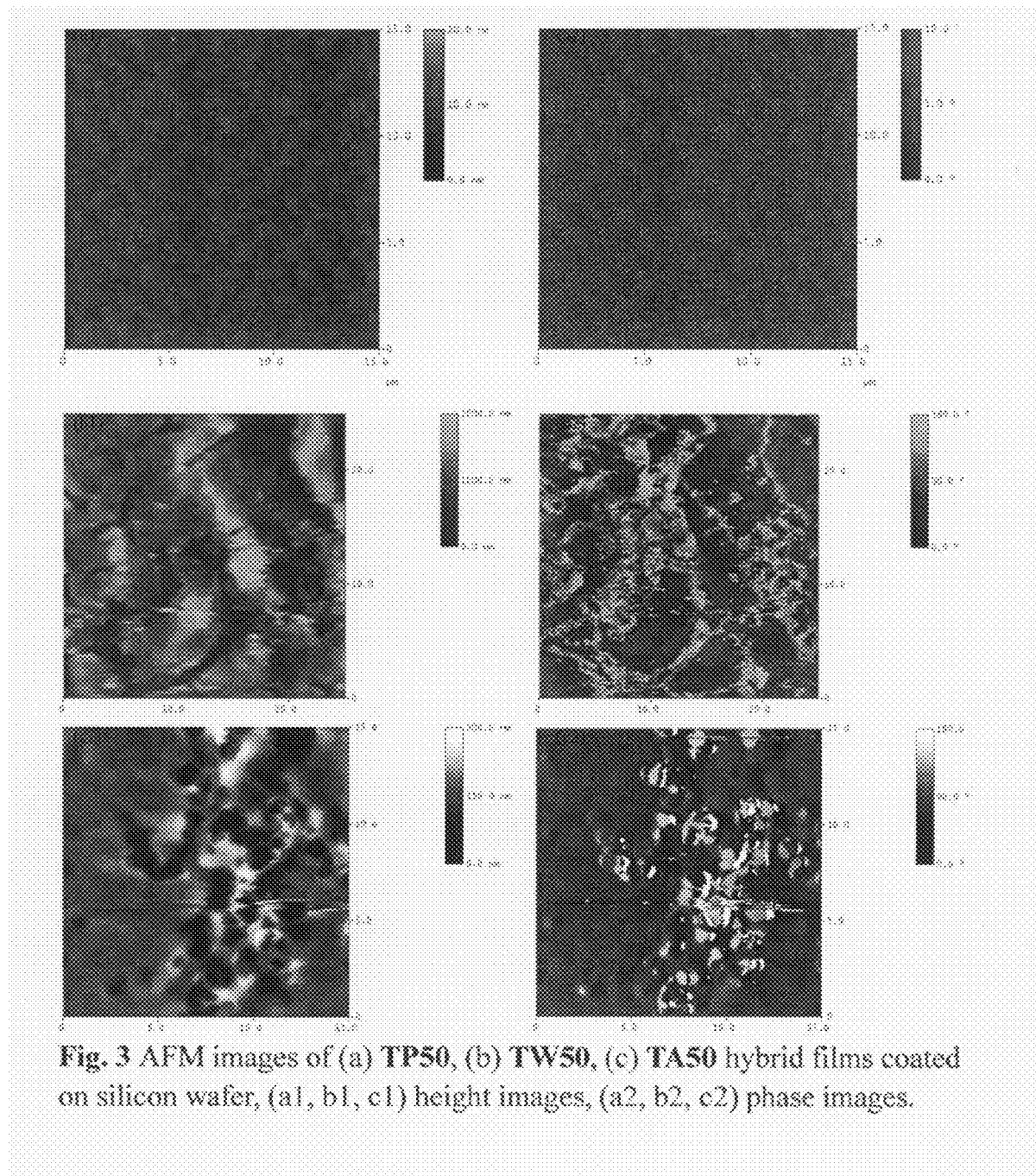
Fig. 3 AFM images of (a) TP50, (b) TW50, (c) TA50 hybrid films coated on silicon wafer, (a1, b1, c1) height images, (a2, b2, c2) phase images.

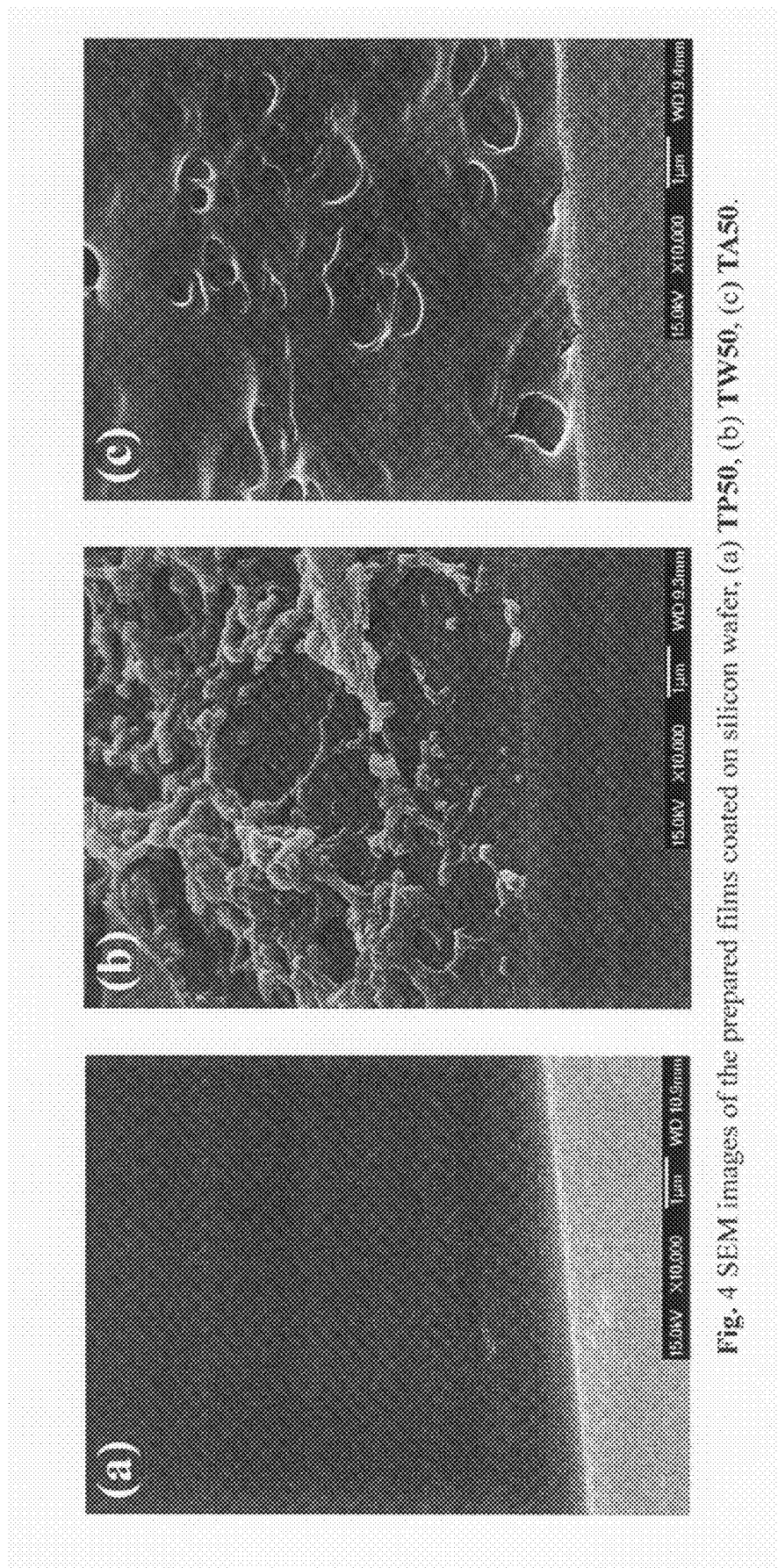
Fig. 4 SEM images of the prepared films coated on silicon wafer. (a) TP50, (b) TW50, (c) TA50.

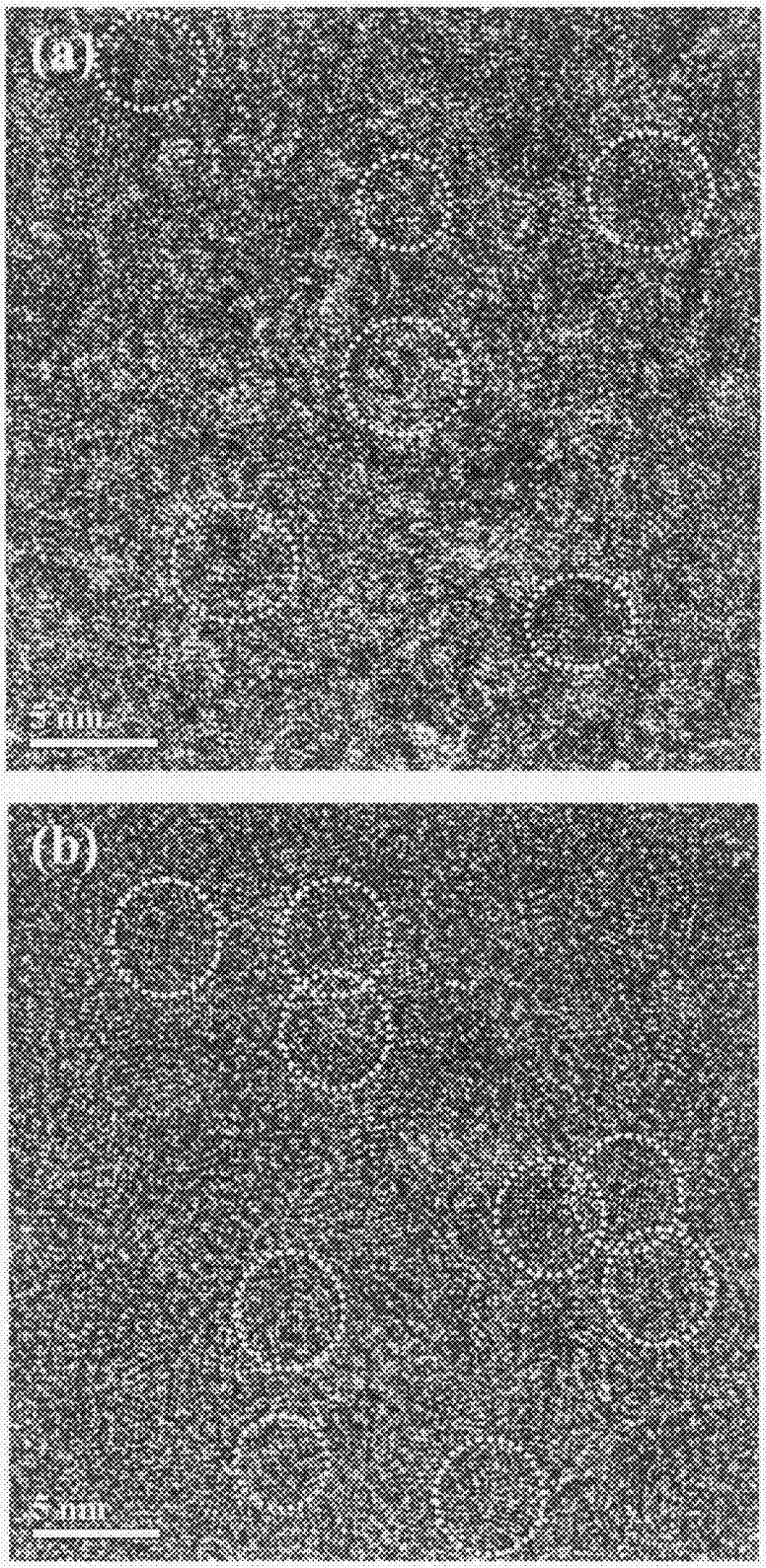
Fig. 5 HRTEM images of (a) TP50 and (b) TP70.

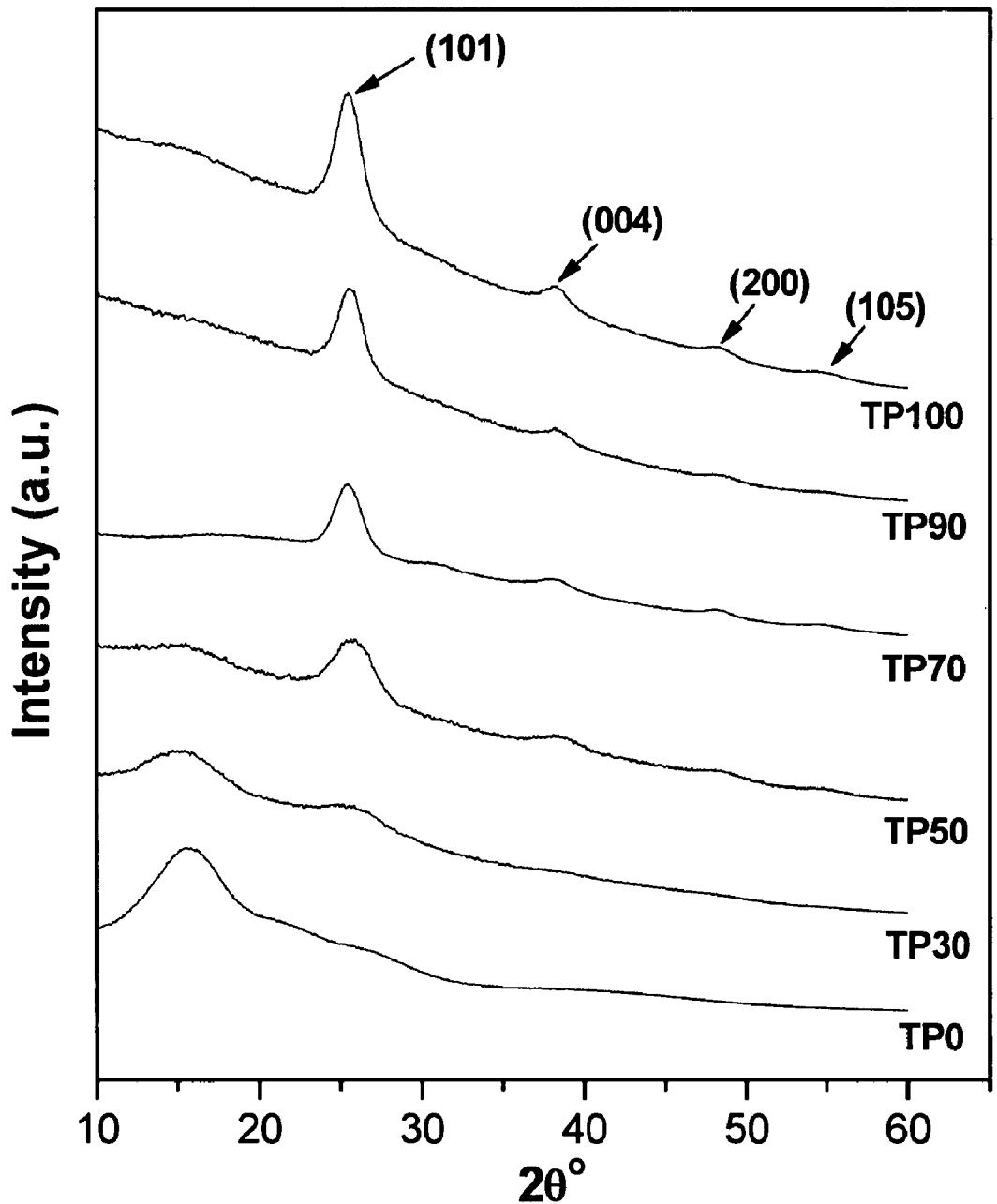
Fig. 6 XRD patterns of TP-series hybrid films images.

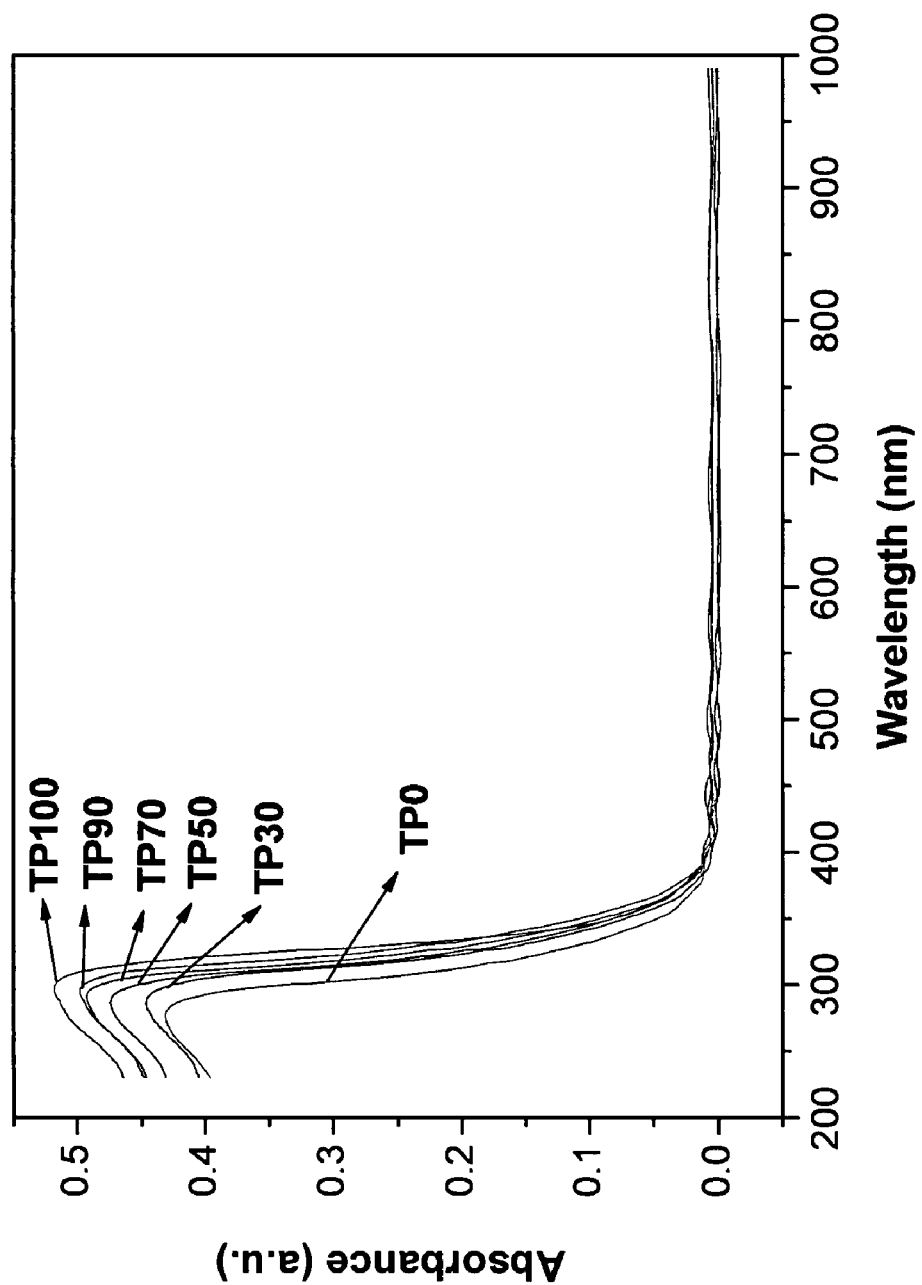
Fig. 7 UV-Vis-NIR absorption spectra of the TP-series hybrid films.

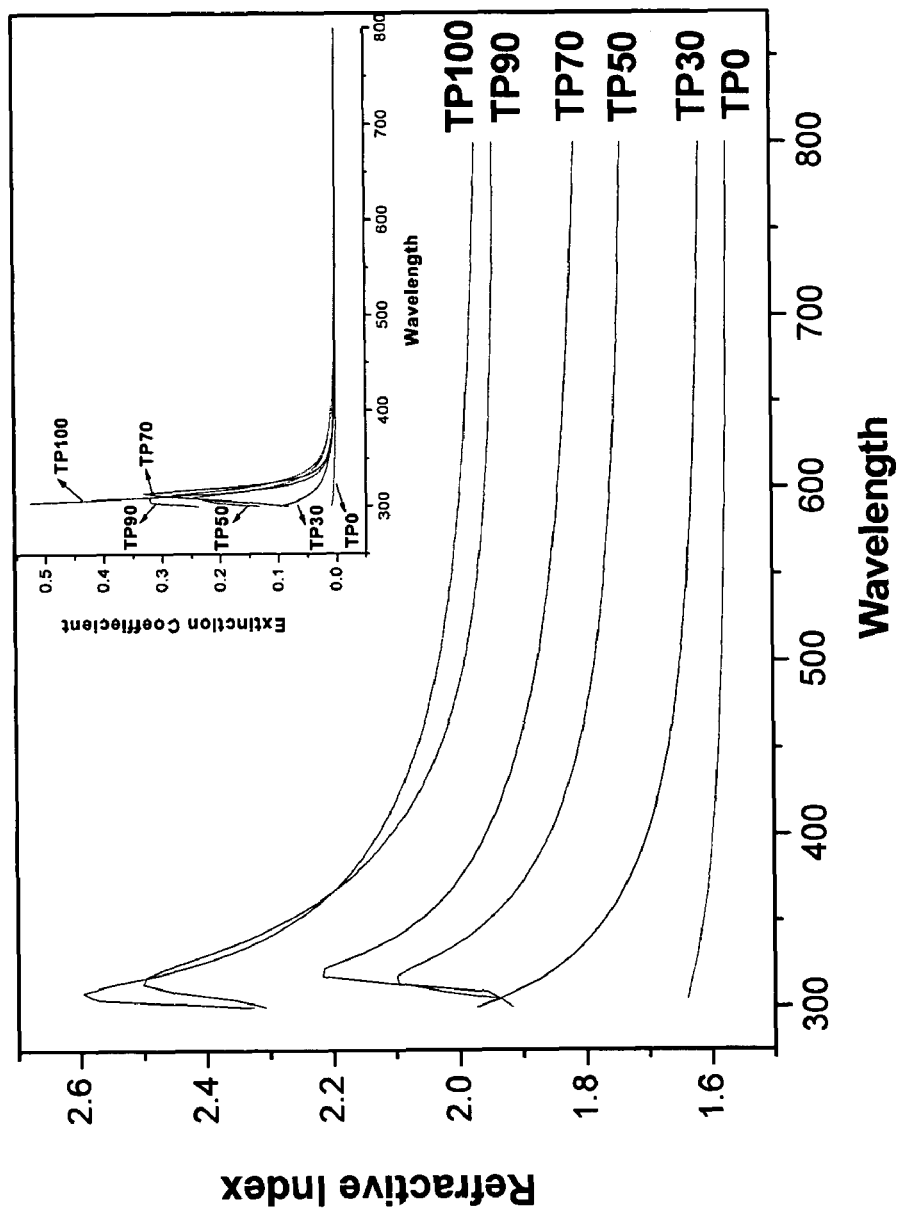
Fig. 8 Variation of the refractive index and the extinction coefficient of the TP-series films.

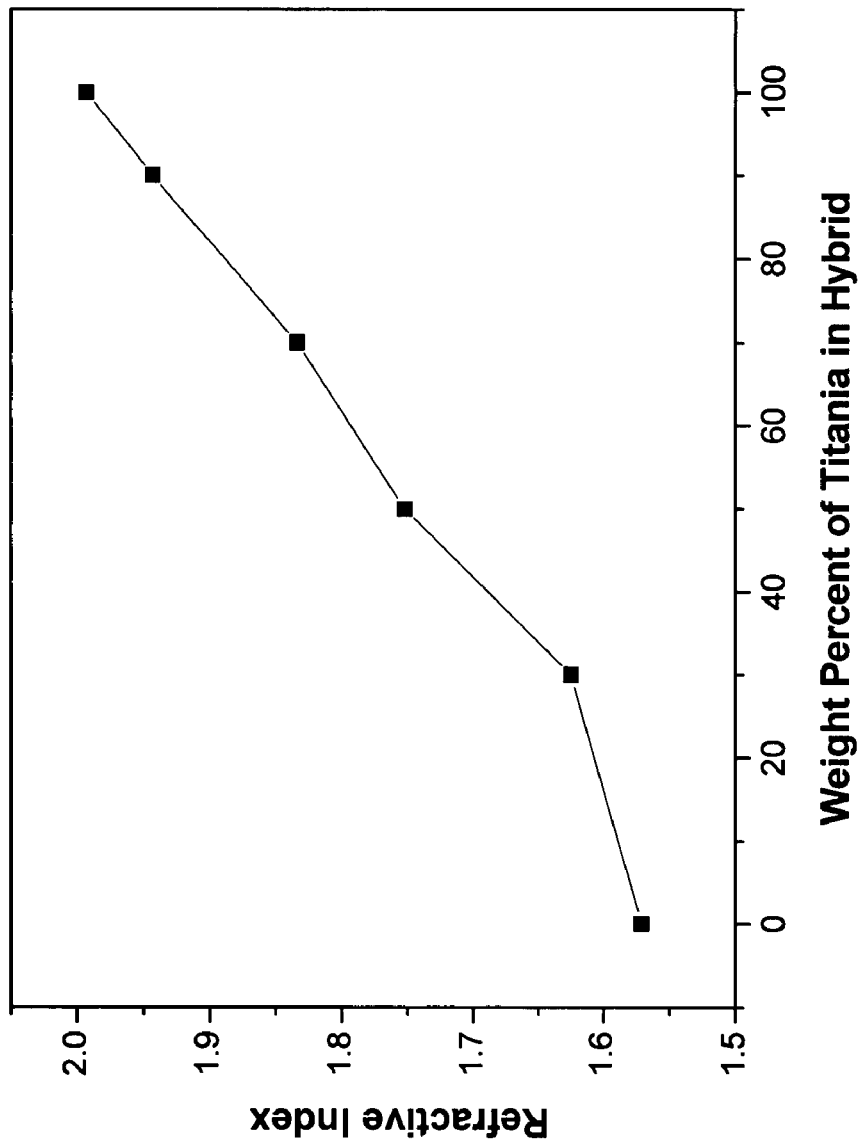
Fig. 9 Variation of the refractive index with the titania content (wt %) for the TP-series hybrid films.

POLYIMIDE-TITANIA HYBRID MATERIALS, THEIR PREPARATION, AND FILM PREPARED FROM THE MATERIALS

TECHNICAL FIELD

The present invention relates to polyimide-titania hybrid materials, their preparation, and film prepared from the materials.

BACKGROUND OF THE INVENTION

Organic-inorganic hybrid materials have been recognized as a new class of advanced materials because of their versatile synthetic approaches and molecular tailing properties.[1-10] The present inventors are particularly interested in the hybrid materials for optical applications, such as high refractive index materials, optical waveguides, antireflection films, etc. For such optical applications, the inorganic domains must be well controlled around 20 nm or less to maintain the optical transparence besides their high refractive index characteristics.

Polymer-titania hybrid materials have been extensively studied as high refractive index materials, including poly(silsesquioxanes),[7-8] poly(methyl methacrylate) (PMMA),[9-15] and polyimide (PI)[16-18], etc. For controlling the titania domain and maintaining good miscibility with polymer moiety in the hybrid materials, sol-gel processing is commonly employed strategy to prepare such hybrid materials. In these systems, the major challenge is to generate specific intermolecular interaction with each other in order to get homogeneous hybrid optical films. The present inventors have successfully prepared trialkoxysilane-capped PMMA-titania hybrid optical thin films by an in situ sol-gel process.[9-10] The prepared hybrid thin films exhibit tunable high refractive index in the range of 1.505-1.876 and very high optical transparence in the visible region. Wang et al further investigated the crystallinity of titania and nonlinear optical behavior after further hydrothermal treatment.[11,13] However, the thermal stability of the PMMA moiety is limited and restricted the applications on optoelectronic devices. Replacing the PMMA moiety in the hybrid materials with a highly thermal stable polymer, such as polyimide, may resolve the problem.

The formation of polyimides containing titania by the incorporation of titanium alkoxide compounds into the precursor polyamic acid (PAA) has been reported.[19] For titanium alkoxide compounds (Ti(OR)$_4$), however, they are very reactive due to the presence of highly electronegative OR groups that render titanium very susceptible to nucleophilic attack and result uncontrolled aggregation. Therefore, a nonhomogeneous distribution of the titania clusters with markedly high concentration and large titania particles with sizes>100 nm, are often observed. In addition, when titanium alkoxide compounds are blend with multifunctional acids of PAA, a fast gelation would occur due to the coordination reaction. To overcome these shortcomings, various approaches to prevent the aggregation and phase separation of titania in the evolving polyimides have been investigated. Chemical modification of titanium with chelating ligands, such as acetylacetone (acac), is one of the commonly employed methods to control the condensation pathway of titanium alkoxide compounds. Various coupling agents, such as 3-aminopropyl trimethoxysilane and 3-methacryloxypropyl trimethoxysilane, are the other ways to stabilize the titanium precursors. These agents are desired to generate the covalent bonding force to connect the organic-inorganic moieties using the heterogeneous condensation (Ti—O—Si). Although polyimides-titania hybrid materials with well-controlled morphologies have been successfully fabricated from the above studies, several drawbacks exist. The additional coupling agents and chelating ligands would still remain in these materials after curing to affect important thermal/mechanical/optical properties. Besides, polyimide-titania materials could be also synthesized using the concept of site isolation.[19] The alkoxides of titanium are known to react with carboxylic acids, leading to the replacement of one or more alkoxides by carboxylate groups. Thus, it is reasonable to expect that the titanium precursors would bind to the polymeric backbones. The coordination of polyimide carbonyl groups to the titanium particles could prevent the aggregation of titania. However, note that there is an upper limit (14%) for the titanium concentration due to the multifunctional acid groups of PAA and the coordination number of titanium is greater than one. Over the limited value, a tridimensional gel is formed. In acrylic-titanium polymers, the polymer containing a well-know ratio of acidic functions is used to get the organotitanium acrylate polymers.[20-22] An excess of titanium alkoxide compounds should be used to obtain the esterified organotitanium acrylate polymers, which are soluble in the organic solvents.

Thus in the present invention, a new synthetic method was developed to prepare synthesize polyimides-nanocrystalline titania hybrid materials with a relatively high titania content.

SUMMARY OF THE INVENTION

The present invention relates to polyimide-titania hybrid material film having relatively good surface planarization, excellent thermal properties (400<Td<550° C.), tunable refractive index (1.571<n<1.993), and highly optical transparency in the visible range.

The present also relates to a method for preparing polyimide-titania hybrid materials, which comprises producing a polyimide containing pendent and/or terminal carboxylic acid, coordinating the carboxylic acid with titanium of titanium alkoxide and sol-gel reacting of titanium alkoxide, to enhance the interaction between polyimide and titania and produce the polyimide-titania hybrid materials without macrophase separation.

The present invention thus relates a method for preparing polyimide-titania hybrid materials, which comprises the steps of:

(a) reacting an aromatic dianhydride monomer with an aromatic diamine monomer and optionally carboxylic acid-substituted aromatic diamine monomer in a mole ratio (x/y) of (moles of aromatic dianhydride)(in terms of x)/(total moles of aromatic diamine and carboxylic acid-substituted aromatic diamine)(in terms of y) is more than 1 to subject the dianhydride to a ring-opening reaction to obtain polyamic acid having terminal anhydride groups;

(b) further subjecting the polyamic acid having terminal anhydride groups from step (a) to ring-opening by adding aniline and/or aminobenzoic acid to obtain a polyamic acid having pendent and/or terminal carboxylic acid group, wherein the total amount of the aniline and/or aminobenzoic acid is 2×(x−y) in moles;

(c) subjecting the polyamic acid having pendent and/or terminal carboxylic acid group from step (b) to imidization (cyclization) to obtain a polyimide having pendent and/or terminal carboxylic acid group; and (d) reacting the polyimide having pendent and/or terminal carboxylic acid group from step (c) with titanium alkoxide to coordinate the carboxylic acid group with titanium atom, then subjecting to hydrolysis and condensation to obtain the polyimide-titania hybrid materials.

According to the method of the present invention, the polyimide having pendent and/or terminal carboxylic acid group from step (c) has an acid number in a range of from 20 mg KOH/g to 200 mg KOH/g.

The polyimide-titania hybrid materials prepared by the present method can be further applied on a substrate to form a film. The resultant film has relatively good surface planarization, excellent thermal properties (400<Td<550° C.), tunable refractive index (1.571<n<1.993), and highly optical transparency in the visible range.

BRIEF DESCRIPTION OF THE DRAWINGS

The present invention is illustrated more detail by reference to the accompanying drawings, wherein:

FIG. 1 shows the FTIR spectra of 6FDA-6FpDA-4ABA, 6FDA-6FpDA-Aniline, TP50, and TP100 films on silicon wafer.

FIG. 2 shows the TGA curves of the TP-series films at a heating rate of 10° C. min$^{-1}$ under a nitrogen flow.

FIG. 3 shows the height and phase AFM images of TP50, TW50, and TA50 hybrid films coated on silicon wafer.

FIG. 4 shows the cross-sectional SEM images of TP50, TW50, and TA50, obtained by tilting the specimen by 45°.

FIG. 5 shows the cross-sectional HRTEM images of TP50 and TP70 thin films.

FIG. 6 shows the XRD patterns of the TP-series powder prepared from their thin films.

FIG. 7 shows UV-Vis-NIR absorption spectra of the TP-series thin films.

FIG. 8 shows the variation of the refractive index and the extinction coefficient of the TP-series films.

FIG. 9 shows the variations of the refractive index of the hybrid films with the titania content.

DETAILED DESCRIPTION THE PRESENT INVENTION

The method for preparing the polyimide-titania hybrid material can be illustrated by reference to the following schemes 1 and 2.

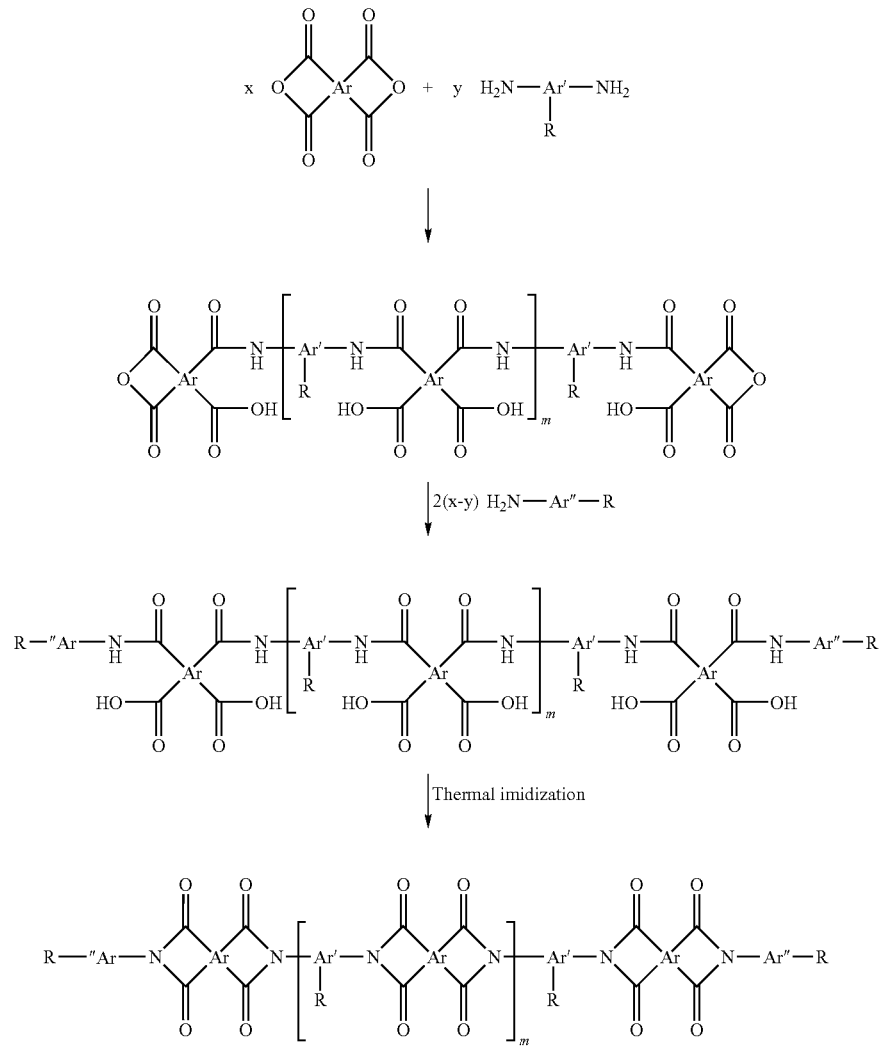

In the above scheme 1, the Rs are the same or different and each represents H or carboxylic acid group (—COOH), Ar, Ar' and Ar" are the same or different and each represents a phenylene (-Ph-), a naphthalene, biphenylene, or the group of formula -Ph-X-Ph- (wherein X represents the group of formula —O-Ph-O—, —O—, —CO—, —S—, —SO—, —SO$_2$—, or a C$_{1-4}$ alkylene group which may be substituted with a halogen(s); m represents a number of from 1 to 30, preferably from 2 to 10; and x/Y>1.

produce polyimide-titania hybrid film from the polyimide-titania hybrid material homogenous solution.

The term "polyamic acid" used herein refers to a product containing both functional groups of —NH—CO— and —COOH (carboxylic acid functional group), which are generated from reaction of the diamine and the dianhydride. The term "polyimide" used herein refers to a product obtained from dehydrating and cyclizing the functional group —NH—

Scheme 2

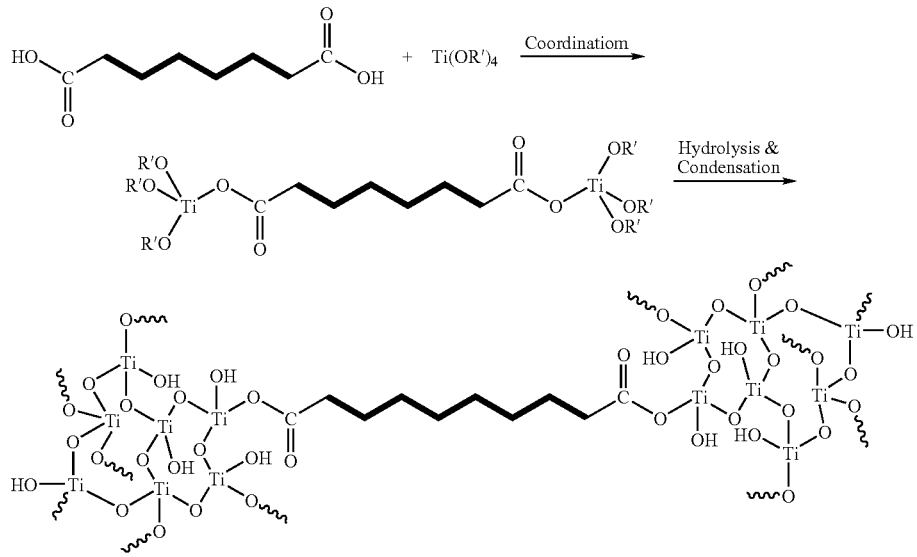

Wherein R's represent a straight or branched C$_{1-6}$ alkyl group.

In the method for preparing polyimide-titania hybrid materials according to the present invention, the carboxylic acid-substituted aromatic diamine is optional used in the step (a). In the case of not using the carboxylic acid-substituted aromatic diamine in the step (a), to obtain polyimide having carboxylic acid group finally, the step (b) should be carried out in the presence of aminobenzoic acid. In the case of using the carboxylic acid-substituted aromatic diamine in the step (a), the step (b) could be carried out in the presence of either aminobenzoic acid or aniline, or the both. When using the carboxylic acid-substituted aromatic diamine in the step (a), the ratio of the aromatic diamine to the carboxylic acid-substituted aromatic diamine is not limited, as long as the acid number of the polyimide having pendent and/or terminal carboxylic acid group obtained from step (c) falls in the range of from 20 mg KOH/g to 200 mg KOH/g. Similarly, when using both aminobenzoic acid and aniline in the step (b), their ratio is not limited as long as the acid number of the polyimide having pendent and/or terminal carboxylic acid group obtained from step (c) falls in the range of from 20 mg KOH/g to 200 mg KOH/g.

According to the method of the present invention, since polyimide contains free carboxylic acid group at terminal and/or pendent, by coordinating the carboxylic acid group with titanium atom of titanium alkoxide, it can obtain polyimide-titania hybrid material homogenous solution without using coupling agent or chelating agent, it is also easily to CO— with the carboxylic acid functional group both contained in the polyamic acid to form polyimide.

Examples of the aromatic dianhydride used in the present method are, for example, but not limited to, 4,4'-(Hexafluoroisopropylidene) diphthalic anhydride (6FDA), pyromellitic dianhydride, 4,4'-oxy-diphthalic anhydride, 3,3',4,4'-biphenyltetracarboxylic dianhydride, 3,3',4,4'-benzophenone-tetracarboxylic dianhydride, ethylene-tetra-carboxylic dianhydride, butanetetracarboxylic dianhydride, cyclopentanetetracarboxylic dianhydride, 2,2',3,3'-benzophenonetetracarboxylic dianhydride, 2,2',3,3'-biphenyl-tetracarboxylic dianhydride, 2,2-bis-(3,4-dicarboxyphenyl)propane dianhydride, 2,2-bis(2,3-dicarboxyphenyl)-propane dianhydride, bis(3,4-dicarboxyphenyl)ether dianhydride, bis-(3,4-dicarboxyphenyl)sulfone dianhydride, 1,1-bis(2,3-dicarboxyphenyl)ethane dianhydride, bis(2,3-dicarboxyphenyl)methane dianhydride, bis-(3,4-dicarboxyphenyl)methane dianhydride, 4,4'-(p-phenylenedioxy)-diphthalic dianhydride, 4,4'-(m-phenylenedioxy)-diphthalic dianhydride, 2,3,6,7-naphthalene-tetracarboxylic dianhydride, 1,4,5,8-naphthalenetetracarboxylic dianhydride, 1,2,5,6-naphthalenetetracarboxylic dianhydride, 1,2,3,4-benzenetetra-carboxylic dianhydride, 3,4,9,10-perylenetetracarboxylic dianhydride, 2,3,6,7-anthracenetetracarboxylic dianhydride, and 1,2,7,8-phenanthrenetetracarboxylic dianhydride. The foregoing dianhydrides can be used alone or in combination of two or more.

Examples of the aromatic diamine used in the present method are, for example, but not limited to, 4,4'-(hexa-fluoroisopropylidene) dianiline (6FpDA), p-phenylene diamine, 4,4-oxydianiline, 1,3-bis(4-aminophenoxy)benzene, 1,3-bis (3-amino-phenoxy)benzene, 2,2-bis[4-(4-aminophenoxy) phenyl]propane, bis[4-(4-aminophenoxy)phenyl]sulfone, 4,4'-bis(4-aminophenoxy)-3,3'-dihydroxybiphenyl, bis[4-(3-aminophenoxy)phenyl]methane, 1,1-bis-[4-(3-aminophenoxy)phenyl]ethane, 1,2-bis[4-(3-aminophenoxy)-phenyl] ethane, 2,2-bis[4-(3-aminophenoxy)phenyl]propane, 2,2'-bis-[4-(3-aminophenoxy)phenyl]butane, 2,2-bis[4-(3-amino-phenoxy)-phenyl]-1,1,1,3,3,3-hexafluoropropane, 4,4'-bis(3-aminophenoxy)-biphenyl, bis[4-(3-aminophenoxy)phenyl]ketone, bis[4-(3-aminophenoxy)phenyl]sulfide, bis[4-(3-aminophenoxy)phenyl]-sulfoxide, bis[4-(3-aminophenoxy)phenyl]sulfone, and bis[4-(3-aminophenoxy)phenyl]ether. The foregoing diamines can be used alone or in combination of two or more.

Example of the carboxy-substituted aromatic diamine used in the present method includes 3,5-diaminobenzoic acid.

In the method of the present invention, the copolymerization in the steps (a) and (b) are carried out under the conventional conditions for preparing polyamic acid and polyimide. The copolymerization is usually carried out in the presence of solvent which has no adverse effect on the reaction, at a temperature of from ambient temperature to 90° C., preferably at a temperature of from 30° C. to 75° C. The solvents can be any kind of aprotic solvent as long as it is inert to the reaction. Examples of the solvent include, but not limit to, N,N-dimethylacetamide (DMAc), 1-methylpyrrolidone (NMP), N,N-dimethylformamide (DMF), tetrahydrofuran (THF), dioxane, methyl ethyl ketone (MEK), chloroform ($CHCl_3$), methylene chloride, and the like. Among them, 1-methylpyrrolidone (NMP) and N,N-dimethylacetamide (DMAc) are preferred. The solvents can be used in one kind or in a mixture of two or more kinds.

In the method of the present invention, the imidization (cyclization) in the step (c) is also carried out in the presence of solvent which has no adverse effect on the reaction, at an elevated temperature, for example, from 120° C. to 220° C., preferably at a temperature of from 150° C. to 220° C. The solvent can use those listed in the above steps (a) and (c). The solvent used in each step can be the same or different, for easily operating, the solvent is preferably the same in each step.

In the method of the present invention, the coordination, hydrolysis, and condensation in the step (d) are carried out under a condition that mole ratio of [Ti]/[COOH] is more than 3, preferably more than 8, in the solvent used in steps (a)~(c), in the presence of water. However, during the reactions, it is preferable that the titanium alkoxide is first dissolved in alkanol solvent. The alkanol solvent is selected depending on the kind of the titanium alkoxide to be reacted. To avoid the alcohol interchange reaction with the alkoxide during the reaction, the alkanol preferably has the same carbon atom number as alkoxide of the titanium alkoxide to be reacted. For example, if the titanium alkoxide is titanium butoxide, butanol is used as the alkanol solvent.

In the present invention, the polyimide-titania hybrid materials can be applied on a substrate and then cured to form a polyimide-titania hybrid film. Applying the hybrid materials on a substrate can be conducted by any coating method well known in this art, including rolling coating method, flow coating method, dip coating method, spray coating method, spin coating method, curtain coating method, and the like. For obtaining an even film, the spin coating method is preferable.

In the formation of film, curing the coated film is conveniently conducted by a baking method, preferably by a multi-stage baking method at a gradient elevated temperature. By the multi-stage baking method, the solvent contained in the coated film would be evaporated slowly to avoid the crack of film. The multi-stage baking method includes, but not limit to, baking the coated film at a temperature of 50 to 70° C. for 15 to 25 minutes, then baking the film at a temperature of 140 to 160° C. for 15 to 25 minutes, then curing it in an oven at a temperature of 290 to 310° C. under a nitrogen atmosphere for several hours, and finally curing it at a temperature of 390 to 420° C. for several hours.

In the present invention, the concept of site isolation was used to synthesize polyimides-titania hybrid materials and without any additional coupling agents or chelating ligands were used. The basic idea is to synthesize and maintain the titania clusters in the endgroups of the polymeric backbone. Firstly, organo-soluble polyimides with carboxylic acid endgroups are synthesized by step polymerization and solution imidization (cyclolization). The weight average molecular weight and the acid value were controlled at from 3000~30000 and from 20~200 mgKOH/g, respectively. Secondly, titanium alkoxide (Ti(OR')$_4$) monomers are added into the polyimides solution then coordination reaction between carboxylic acid and titanium would occur simultaneously. A threshold value of the molar ratio Ti/COOH must exceed 3 to obtain a homogeneous and meta-stable precursor. Appropriate amount of water and acid catalyst ([$H^+$]=0.1 mole/Kg and [$H_2O$]/[Ti]=2) are added dropwise to proceed the hydrolysis-condensation reaction of Ti(OR')$_4$. In the present invention, appropriate mix solvents system (n-butyl alcohol (BuOH):N, N'-dimethylacetamide (DMAc)=1:1) is preferably chosen to prevent from precipitation and gelation. Following spin-coating and thermal curing, highly homogeneous hybrid films with different content of titania could be obtained. These films possess relatively good surface planarization, excellent thermal properties ($400 < Td < 550°$ C.), tunable refractive index ($1.571 < n < 1.993$), and highly optical transparency in the visible range. AFM and SEM investigated the effects of the two kind interactions on morphological changes. TEM results demonstrated that the titania nanoclusters were homogeneous dispersed in polyimide matrices.

EXPERIMENTAL EXAMPLES

Material 4,4'-(hexafluoroisopropylidene) diphthalic anhydride (6FDA) and 4,4'-(hexafluoroisopropylidene) dianiline (6FpDA) were obtained from Chriskev company (USA) with a purity level of 99%. 4-aminobenzoic acid (4ABA), aniline, and titanium n-butoxide (Ti(OBu)$_4$) were obtained from ACROS (Belgium) with purity levels of 99, 99.5, and 99%. All monomers were purchased and used without purification. Solvent, 1-methyl-2-pyrrolidinone (NMP), 1,3-dichlorobenzene (DCB), N,N'-dimethyl-acetamide (DMAc), and n-butyl alcohol (BuOH) were obtained from TEDIA. The acid catalyst of titanium n-butoxide, 37.5 wt % HCl, was used as received from Scharlau Chemie.

Example 1

Synthesis of Organo-Soluble Polyimide with Carboxylic Acid Endgroups (6FDA-6FpDA-4ABA)

A solution-imidization technique was employed to synthesize the organo-soluble polyimide (6FDA-6FpDA-4ABA)

with carboxylic acid endgroups as show in Scheme 3[23]. The molecular weight and endgroup functionality could be achieved by controlling the reactant stoichiometry.

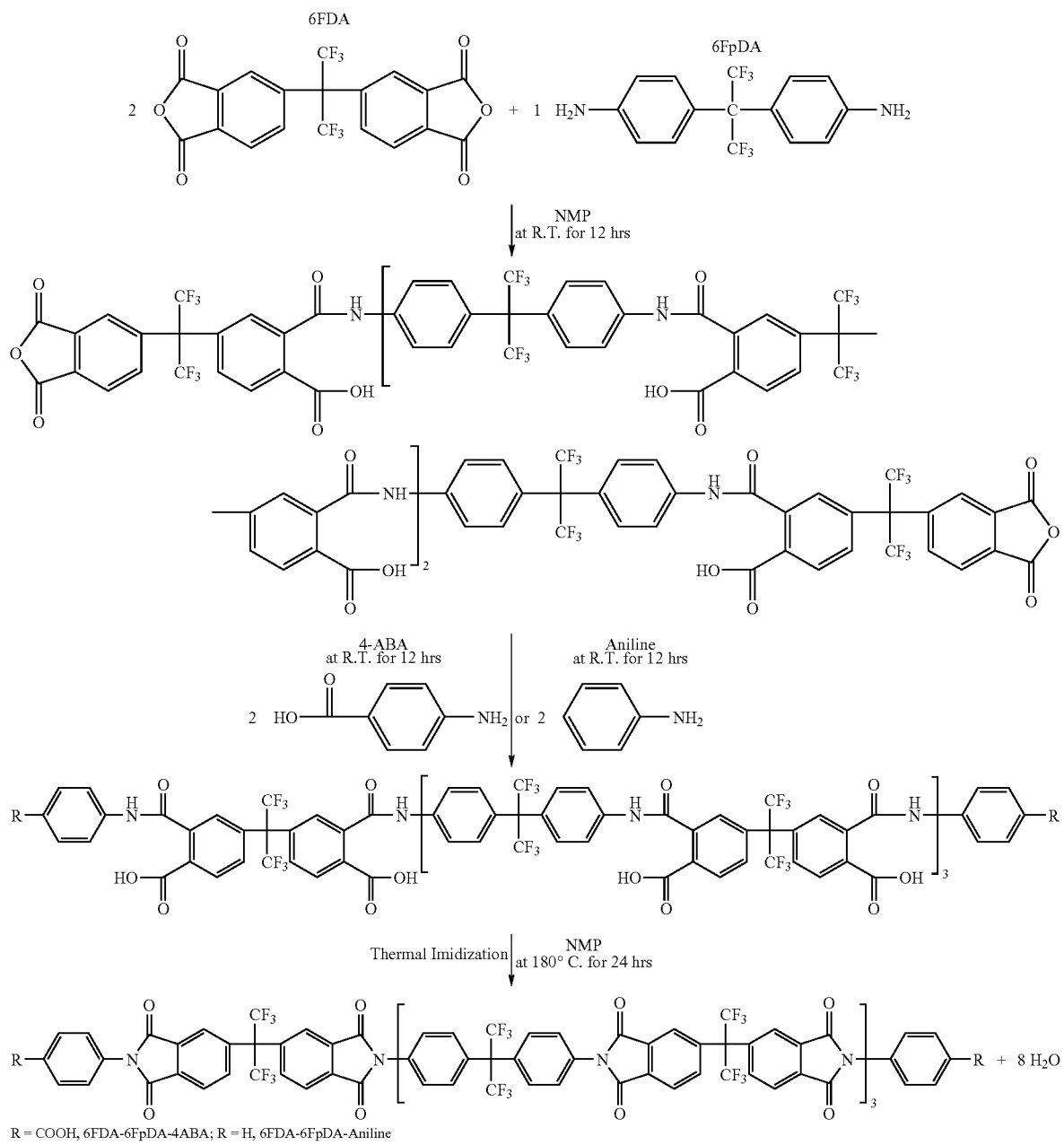

Firstly, 4,4'-(hexafluoroisopropylidene) dianiline (6FpDA, 3.34 g, 0.01 mol) was added into a 150 ml three-necked round bottom flask and 48 g of NMP was used to dissolve the reactants. 4,4'-(Hexafluoroisopropylidene) diphthalic anhydride (6FDA, 8.88 g, 0.02 mole) was slowly added into the above solution with vigorous stirring and nitrogen purge. The mixture solution was allowed to react for 8 h at room temperature. Secondly, 2.88 g (0.021 mole) of 4-aminobenzoic acid (4ABA) and 12 g of 1,3-dichlorobenzene (DCB) were added into the above solution. The 20 wt % polyamic acid (PAA) solution was formed after constantly stirring the reactants for 16 h at room temperature. Then, the PAA solution was thermally imidization in a 180° C. silicon oil bath for another 12 h and cooled to room temperature. The homogeneous 6FDA-6FpDA-4ABA solution was precipitated with 500 ml of methanol and redissolved in 30 ml of THF for twice times. A white-gray precipitate was recovered and subsequently dried in a vacuum oven at 150° C. for 24 h to yield 4.62 g (28.2 wt %). The acid value of 6FDA-6FpDA-4ABA was 40 mgKOH/g using titration. The concentration of measured polyimide was 0.5 wt % in toluene and 0.1 N KOH in ethanol was used as titrants. The average molecular weight estimated by acid value was 3000. The weight-average molecular weight estimated by GPC was 3667 with the polydispersity index of 1.2028.

Comparative Example 1

Synthesis of Organo-Soluble Polyimide Without Carboxylic Acid Endgroups (6FDA-6FpDA-Aniline)

The same procedure as above was followed, except that 1.96 g (0.021 mole) of aniline was used in place of 2.88 g (0.021 mole) 4ABA. The yield of 6FDA-6FpDA-Aniline was 24 wt % and acid value was about 0 mgKOH/g using titration. The weight-average molecular weight estimated by GPC was 3443 with the polydispersity index of 1.2584.

Synthesis of Polyimide-Titania Hybrid Precursors and Preparation of the TP-Series Hybrid Thin Films The reaction scheme of polyimide-titania hybrid precursors and preparation of the TP-series hybrid thin films were shown in Scheme 4.

spin-coated on silicon wafer at 2000 rpm for 20 seconds. Then, the substrates coated with the films were softened-baked at 60° C. on a hot plate for 10 minutes, cured at 150° C. for 30 minutes, and then 300° C. for 1 hour.

Characterization

FTIR spectra of the materials on the doubly polished silicon wafers were obtained with a Perkin Elmer PARAGON 1000. UV-Vis spectra of the T-series thin films on quartz were obtained using a Perkin Elmer Lambda 20 at room temperature. Gel permeation chromatographic (GPC) analysis was performed on Waters GPC system consisting of, Waters 2414 RI detector, Shodex columns (KF-802,803,805), Waters 717 plus auto-sampler, and Waters 515 HPLC pump. The system was calibrated using polystyrene standards. THF was used as the eluent, at a flow rate of 1.0 mL/min. TGA and DSC thermal analyses were conducted on a Perkin Elmer pyris 1 TGA and a TA Q100 with a refrigerated cooling system, respectively. Both measurements were performed under continuous flow nitrogen, at a heating rate 10° C./min. AFM (Model D15000, Nanoscope) and FESEM (JSM-6700F, JEOL) were used to analysis the surface morphology of the coated films. A prism coupler (Model 2100, Metricon) and

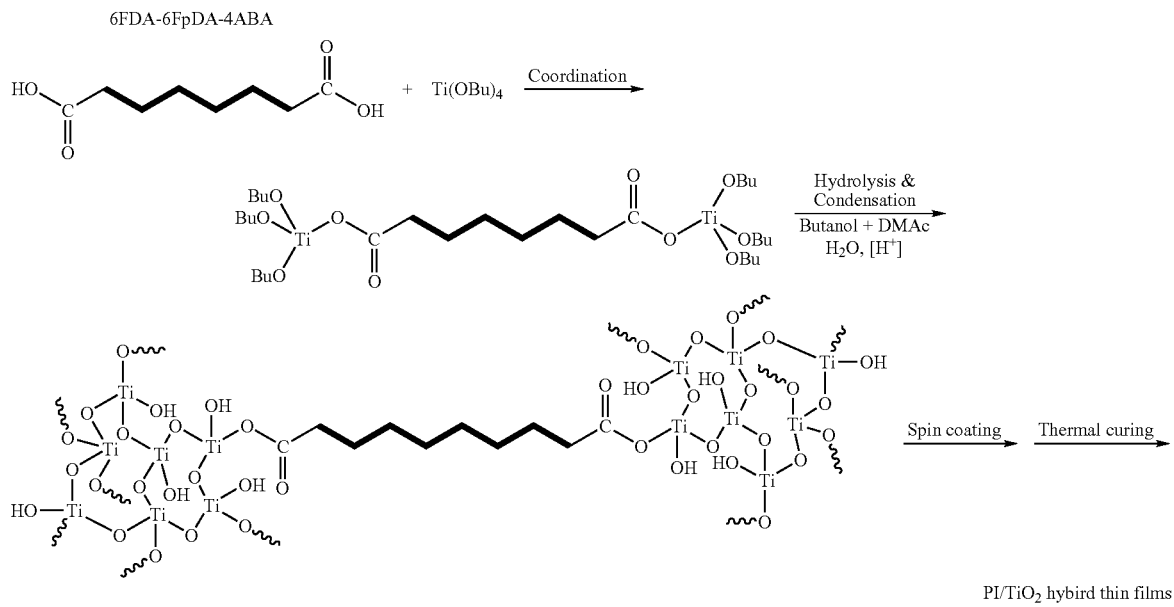

TP50 (which means a polyimide-titania hybrid materials containing 50 wt % of titania) as example, firstly, 1.0625 g ($3.125 \times 10^{-3}$ mole) of Ti(OBu)$_4$ (0.25 g of TiO$_2$) and 2.5 ml butanol were added into 25 ml round bottom flask. Butanol was used to avoid alcohol interchange reaction with titanium n-butoxide. 0.25 g ($1.78 \times 10^{-4}$ mole [COOH]) of 6FDA-6FpDA-4ABA dissolved in 2.5 ml DMAc were added dropwise into the above solution by syringe. Secondly, 0.0625 g (37 wt %) of HCl aqueous solution, 0.073 g of H$_2$O, and 1.25 ml butanol were mixed very well to get homogeneous solution. The above solution was very slowly added into the PI/TiO$_2$ solution and stirred at room temperature for 30 minutes. To prepare the TP50 hybrid thin film, the precursor solution was filtered by a 0.2 μm PTFE filter prior to use and ellipsometer (GES-5E, SOPRA) were used to measure the film thickness and refractive index of the prepared thin films at the wavelength of 633 nm: The microstructures of the T-series thin films were examined by using a high-resolution transmission electron microscope (JEM-2100F, JEOL). X-ray diffraction (XRD) was performed at a MicroMax 002 X-ray scattering instrument (PSAXS-USH-WAXS-002, Osmic) using CuKα radiation (1.5406 Å) with comparable intensity to a focused beam from a rotating anode generator at room temperature.

Results and Discussion

When the polyimide bearing acid endgroups was added into the Ti(OBu)$_4$ solution, the chelating phenomenon between carboxylic acid and butoxy groups would occur simultaneously due to the reactive acid groups for coordinating with titanium atoms. So the behavior of the hybrids according to the molar ratio of [Ti]/[COOH] was interesting and necessary to be examined. If a stoichiometric molar ratio of [Ti]/[COOH]=1 was chosen, the gelation would be formed simultaneously after the polyimide was added. A definite molar ratio of [Ti]/[COOH], the threshold value>3, would allow one to obtain not a gel but a transparent solution. The value of this threshold was valid for many parameters, such as the alkyl chain of $Ti(OR')_4$, the acid value and molecular weight of polyimide, the solid content, and temperature . . . etc. The new increase of the molar ratio of [Ti]/[COOH] could give rise to a more stable solution. These results revealed that the bridging bidentate mode of titanium, the main coordination mode for tridimensional gel, could be inhibited with increasing the loading ratio of $Ti(OBu)_4$.

In the present invention, the larger value ([Ti]/[COOH]>8) than the threshold was chosen to obtain the stable solution and further sol-gel process was executed to form the homogeneous hybrid thin films. During the sol-gel process, the meta-stable solution could be well controlled by appropriate experimental conditions, $[H^+]$=0.1 mole/Kg and $[H_2O]$/[Ti]=2. Although the undesired gelation would still occur with the storage time increased, the time before gelation was enough to spin-on the thin films. The molar ratio of $[H_2O]$/[Ti] could be also decreased to get the more stable and the longer gel time. But the degree of hydrolysis-condensation of $Ti(OBu)_4$ is too less to convert completely to titania. If 6FDA-6FpDA-Aniline (without acid endgroups) were in place of 6FDA-6FpDA-4ABA, the mixtures would have no crosslinking points and be very stable no matter what any molar ratio of [Ti]/[COOH]. However, the formed films would occur serious phase separation due to the absence of the interaction force between titania and polyimide. The phenomenon would be examined by morphologic analyses and discussed later. To conclude, these results showed that the polyimides have been already coordinated with titanium through carboxylic acid groups and play a major role for gelation.

TABLE 1

Properties of the TP-series hybrid films

| | Reactant condition | | Film | | | |
|---|---|---|---|---|---|---|
| Sample | 6FDA-6FpDA-4ABA wt % | $Ti(OBu)_4$ wt % | $TiO_2$ content wt % | $h^a$ nm | $Rq^b$ nm | $n^c$ 633 nm |
| TP0 | 100 | 0 | 0 | 972 | 6.45 | 1.571 |
| TP30 | 35.4 | 64.6 | 30 | 582 | 5.12 | 1.625 |
| TP50 | 19.0 | 81.0 | 50 | 345 | 1.60 | 1.752 |
| TP70 | 9.2 | 90.8 | 70 | 318 | 0.36 | 1.834 |
| TP90 | 2.5 | 97.5 | 90 | 201 | 0.21 | 1.943 |
| TP100 | 0 | 100 | 100 | 130 | 0.30 | 1.993 |

$^a$h = film thickness,
$^b$Rq is the root mean square roughness,
$^c$n = refractive index.
*In Table 1, the letter "T" in the symbol TP represents titanium, "P" represents polyimide, and the number following the symbol TP represents the weight percent of titania.

FIG. 1 shows the FTIR spectra of 6FDA-6FpDA-4ABA, 6FDA-6FpDA-Aniline, TP50, and TP100 films on silicon wafer. In the spectrum of 6FDA-6FpDA-4ABA, the polyamic acid peak at 1690 $cm^{-1}$ disappears after the solution imidization. Besides, the characteristic imide groups are observed at the following peaks: 1788 $cm^{-1}$ (C=O asym. str.), 1726 $cm^{-1}$ (C=O sym. str.), and 1370 $cm^{-1}$ (C—N str.), respectively. Also, the characteristic peak of carboxylic acid ending group is observed in the region of 3100-3600 $cm^{-1}$. On the other hand, the characteristic peak of carboxylic acid is not observed in the spectrum of 6FDA-6FpDA-Anline due to absence of the acid endgroups. These results reveal that the organo-soluble polyimides with and without carboxylic acid endgroups have been synthesized successfully. In the spectrum of the polyimide-titania thin film (TP50), although the coordination characteristic peak of the carboxylate groups with titanium could not be clealrly observed in the 1630-1340 $cm^{-1}$ region due to the overlapping with the absorption of the aromatic and imide groups the large reduction on the absorption peak of the carboxylic acid at 3200-3600 $cm^{-1}$ suggests the esterification reaction between carboxylic acid and titanium. In addition, the inorganic Ti—O—Ti band is also observed at 600-850 $cm^{-1}$.

FIG. 2 shows the TGA curves of the TP-series films at a heating rate of 10° $C.min^{-1}$ under a nitrogen flow. It is clearly seen that the all TP-series samples exhibit good thermal stability (400<Td<550° C.). Meanwhile, the char yield of TP series samples at 800° C. increased gradually from 63 wt % (TP30) to 98 wt % (TP100) also indicates that the inorganic parts of titania have been successfully incorporated into the polyimide structures. For pure polyimide 6FDA-6FpDA-4ABA (TP0), one glass transition temperature (Tg) was observed at 248° C. However, no Tg is observed for all of the polyimide-Titania hybrid materials. It is probably that the titania limit the mobility of the polyimide segment was restricted and thus no Tg was observed.

FIG. 3(a) shows the height and phase AFM images of TP50 thin film. The surface roughness of the hybrid films analyzed by AFM is listed in Table 1. For TP50 thin film, the appearances of topographic and phase image show high homogeneously dispersion of titania. As shown in Table 1, the surface roughness of the hybrid films is 5.122 nm, 1.607 nm, 0.364 nm, 0.214 nm, and 0.309 nm for TP30, TP50, TP70, TP90, and TP100, respectively. It suggests the homogeneous hybrid films are obtained. Here, two compared methods were examined to address the morphologic changes resulted from the interaction force of polyimide and titanium. In the first method, except that no acid catalyst and water were added, the same procedure as TP50 was followed (sample TW50). In the second method, the same preparation as TP50 was followed, except that 6FDA-6FpDA-Aniline was used in place of 6FDA-6FpDA-4ABA (sample TA50). Further characterizations of these specimens were achieved by AFM measurements (FIG. 3(b, c)). TW50 image shows continuous aggregation of titania in the polyimide matrices and TA50 image shows isolated aggregation. The phase-separation morphologies would be different from the absence of condensation or coordination force. For TW50 sample, the polyimide (6FDA-6FpDA-4ABA) has coordinated with $Ti(OBu)_4$ to generate polyimide-titania clusters. Owing to the absence of the condensation reaction of $Ti(OBu)_4$ for covalent bonding, however, every polyimide-titania cluster could not connect together very well and would aggregate to the continuous phase separation. In the phase image of TW50, the continuous brighter domains may be the titania rich phase and the darker domains may be the polyimides because titania is the hard inorganic segments of the composites. For TA50 sample (6FDA-6FpDA-Aniline), the polyimide without carboxylic acid end groups was in place of 6FDA-6FpDA-4ABA. There is no coordination force to connect the polyimide and the titania. Therefore, isolated aggregation of titania are formed after spin coating and the volume of the isolated domains is shrinkage due to the condensation reaction of Ti—OH groups after thermal curing. The isolated domains shown in the topographic image are concavity. Meanwhile, in the phase image, the isolated domains are brighter due to the hard inorganic titania segments. Research in above results could verify that coordination and condensation reaction of titania precursors have a powerful impact on the morphologies of polyimide-trapped titania nanoclusters. FIG. 4 shows the cross-sectional SEM images of TP50, TW50, and TA50, obtained by tilting the specimen by 45°. TP50 shows uniform surface with no apparent microstructure and no titania aggregates. For TW50 and TA50, however, the images show the serious phase separation and different morphologies conformed to the AFM results.

The cross-sectional HRTEM images of TP50 and TP70 thin films are shown in FIG. 5. As shown in the figure, the titania nanocrystallites with the average size of 3-4 nm are presented in the amorphous polyimide matrix of polyimides and/or nano-crystallite titania networks. FIG. 6 shows the XRD patterns of the TP-series powder prepared from their thin films. For TP50, four peaks, 25.2° 37.7°, 48.1°, and 54.2°, corresponding to the (101), (004), (200), and (105) crystalline plane of the anatase titania phase, are observed. Much more enhanced titania crystallites are obviously shown by TP90. The broad width of the peaks is due to scattering of X-ray resulted from the small size of the titania nanocrystalline grains. It suggests that titania clusters is well dispersed in polyimides through the esterification and hydrolysis-condensation reactions.

FIG. 7 shows UV-Vis-NIR absorption spectra of the TP-series thin films. All the samples posses highly transparency in the visible region and absorption bands in the UV region. The charge transfers of the chromophoric units of the polyimide structure and the excitation electrons from valence band to the conduction band of titania are mainly contributed to the obvious absorption in the UV region between 250-350 nm. By increasing the titania content, the intensity of the absorption band is enhanced and the red-shifted of the band edge is observed. These results indicate that the titania size would be increased in nano scale and the highly homogeneous dispersions of polyimide-titania. Data analyses for the contribution of titania in optical properties are conducted using ellipsometer and the fitted curves are showed in FIG. 8. The refractive index distribution indicates that the incorporation of titania segments into the polyimide matrices results in an increase of refractive index due to their molar polaration. For pure polyimide (TP0), the refractive index is 1.571 at 633 nm. Increasing the content of titania segments, such as TP30, TP50, TP70, and TP90, the refractive index is 1.625, 1.752, 1.834, and 1.943 at 633 nm, respectively. The refractive index of pure titania (TP100) is 1.993 at 633 nm, which supports the above argument. Meanwhile, the extinction coefficient curves inserted in FIG. 8 show that the TP-series films have excellent optical transparency in the visible region. FIG. 9 illustrates the variations of the refractive index of the hybrid films with the titania content. The refractive index increases from 1.625 for TP30 with a titania content of 30 wt % to 1.943 for TP90 with a titania content of 90 wt %. The relatively high refractive index and high optical transparence of the prepared polyimide-titania hybrid films suggest their potential applications in optical devices.

CONCLUSIONS

According to the present invention, high refractive index polyimide titania hybrid optical thin films were successfully prepared from the soluble polyimde with carboxylic acid end group with titanium butoxide by controlling the organic/inorganic mole ratio, water/acid content, and mixed solvent system. The nanocrystalline titania domain in the polyimide matrice could be as high as 90 wt % and thus the refractive index of 1.943 was achieved. The hybrid films also possessed excellent thermal properties and highly optical transparency in the visible region. Therefore, the prepared polyimide-titania hybrid thin films could have the potential applications for optoelectronic devices.

While the present invention has been particularly shown and described with reference to exemplary embodiments thereof, it will be understood by those of ordinary skill in the art that various changes in form and details may be made therein without departing from the spirit and scope of the present invention as defined by the following claims.

REFERENCE

1 K. G Sharp, *Adv. Mater.*, 1998, 10, 1243.
2 H. Althues, J. Henle and S. Kaskel, *Chem. Sco. Rev.*, 2007, 36, 1454.
3 W. Caseri, *Macromol. Rapid Commun.*, 2000, 21, 705
4 C. Lu, Z. Cui, Y. Wang, Z. Li, C. Guan, B. Yang and J. Shen, *J. Mater. Chem.*, 2003, 13, 2189.
5 C. Lu, C. Guan, Y. Liu, Y. Cheng and B. Yang, *Chem. Mater.*, 2005, 17, 2448.
6 T. Kyprianidou-Leodidou, H. J. Althaus, Y. Wyser, D. Vetter, M. Büchler, W. Caseri and U. W. Suter, *J. Mater. Res.*, 1997, 12, 2198.
7 W. C. Chen, L. H. Lee, B. F. Chen and C. T. Yen, *J. Mater. Chem.*, 2002, 12, 6344.
8 W. C. Chen, W. C. Liu, P. T. Wu and P. F. Chen, *Mater. Chem. Phys.*, 2004, 83, 71.
9 W. C. Chen, S. J. Lee, L. H. Lee and J. L. Lin, *J. Mater. Chem.*, 1999, 9, 2999.
10 L. H. Lee and W. C. Chen, *Chem. Mater.*, 2001, 13, 1137.
11 A. H. Yuwono, J. Xue, J. Wang, H. I. Elim, W. Ji, Y. Li and T. J. White, *J. Mater. Chem.*, 2003, 13, 1475.
12 H. I. Elim, W. Ji, A. H. Yuwono, J. M. Xue, J. Wang, *Appl. Phys. Lett.*, 2003, 82, 2691.
13 A. H. Yuwono, B. Liu, J. Xue, J. Wang, H. I. Elim, W. Ji, Y. Li and T. J. White, *J. Mater. Chem.*, 2004, 14, 2978.
15 A. H. Yuwono, J. Xue, J. Wang, H. I. Elim and W. Ji, *J. Elecroceram.*, 2006, 16, 431.
15 A. H. Yuwono, Y. Zhang, J. Wang, X. H. Zhang, H. Fan and W. Ji, *Chem. Mater.*, 2006, 18, 5876.
16 C. C. Chang and W. C. Chen, *J. Polym. Sci. Part A: Polym. Chem.*, 2001, 39, 3419.
17 C. M. Chang, C. L. Chang and C. C. Chang, *Macromol. Mater. Eng.*, 2006, 291, 1521.
18 P. C. Chiang and W. T. Whang, *Polymer*, 2003, 44, 2249.
19 M. Nandi, J. A. Conklin, L. Salvati and A. Sen, *Chem. Mater.*, 1991, 3, 201.
20 M. Camail, M. Humbert, A. Margaillan, A. Riondel and J. L. Vernet, *Polymer*, 1998, 39, 6525.
21 M. Camail, M. Humbert, A. Margaillan and J. L. Vernet, *Polymer*, 1998, 39, 6533.
22 F. X. Perrin, V Nguyen and J. L. Vernet, *J. Sol-Gel Sci. Technol.*, 2003, 28, 205.
23 T. Matsuura, Y. Hasuda, S, Nishi and N. Tamada, *Macromolecules*, 1991, 24, 5001.

What is claimed is:
1. A method for preparing polyimide-titania hybrid material, which comprises the steps of:
(a) reacting an aromatic dianhydride monomer with an aromatic diamine monomer and optionally carboxylic acid-substituted aromatic diamine monomer in a mole ratio (x/y) of (moles of aromatic dianhydride)(in terms of x)/(total moles of aromatic diamine and carboxylic acid-substituted aromatic diamine)(in terms of y) is more than 1 to subject the dianhydride to a ring-opening reaction to obtain polyamic acid having a terminal anhydride group;

(b) further subjecting the polyamic acid having a terminal anhydride group from step (a) to ring-opening by adding aniline and/or aminobenzoic acid to obtain a polyamic acid having pendent and/or terminal carboxylic acid group, wherein the amount of the aniline and/or aminobenzoic acid is 2×(x−y) in total moles;

(c) subjecting the polyamic acid having pendent and/or terminal carboxylic acid group from step (b) to imidization (cyclization) to obtain a polyimide having pendent and/or terminal carboxylic acid group; and (d) reacting the polyimide having pendent and/or terminal carboxylic acid group from step (c) with titanium alkoxide to coordinate the carboxylic acid group with titanium atom, then subjecting to hydrolysis and condensation to obtain the polyimide-titania hybrid material.

2. The method according to claim 1, wherein the polyimide having pendent and/or terminal carboxylic acid group from step (c) has an acid number in a range of from 20 mg KOH/g to 200 mg KOH/g.

3. The method according to claim 1, wherein the step (a) is carried out in the absence of carboxylic acid-substituted aromatic diamine and the step (b) is carried in the presence of at least the aminobenzoic acid.

4. The method according to claim 1, wherein the step (a) is carried out in the presence of carboxylic acid-substituted aromatic diamine and the step (b) is carried in the presence of the aniline and/or aminobenzoic acid.

5. The method according to claim 1, wherein the aromatic dianhydride is one or more compounds selected from the group consisting of 4,4'-(Hexafluoroisopropylidene) diphthalic anhydride (6FDA), pyromellitic dianhydride, 4,4'-oxydiphthalic anhydride, 3,3',4,4'-biphenyltetracarboxylic dianhydride, 3,3,4,4'-benzophenonetetracarboxylic dianhydride, ethylenetetracarboxylic dianhydride, butanetetracarboxylic dianhydride, cyclopentane-tetracarboxylic dianhydride, 2,2',3,3'-benzophenonetetracarboxylic dianhydride, 2,2',3,3'-biphenyl-tetracarboxylic dianhydride, 2,2-bis-(3,4-dicarboxyphenyl)propane dianhydride, 2,2-bis(2,3-dicarboxyphenyl)propane dianhydride, bis(3,4-dicarboxyphenyl)ether dianhydride, bis-(3,4-dicarboxyphenyl)sulfone dianhydride, 1,1-bis(2,3-dicarboxyphenyl)ethane dianhydride, bis(2,3-dicarboxyphenyl)methane dianhydride, bis(3,4-dicarboxyphenyl)-methane dianhydride, 4,4'-(p-phenylenedioxy)diphthalic dianhydride, 4,4'-(m-phenylenedioxy)diphthalic dianhydride, 2,3,6,7-naphthalene-tetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, and 1,2,7,8-phenanthrenetetracarboxylic dianhydride.

6. The method according to claim 1, wherein the aromatic diamine is one or more compounds selected from the group consisting of 4,4'-(hexafluoroisopropylidene) dianiline (6FpDA), p-phenylene diamine, 4,4-oxydianiline, 1,3-bis(4-aminophenoxy)benzene, 1,3-bis(3-aminophenoxy)benzene, 2,2-bis[4-(4-aminophenoxy)phenyl]propane, bis[4-(4-aminophenoxy)phenyl]sulfone, 4,4'-bis(4-aminophenoxy)-3,3'-dihydroxybiphenyl, bis[4-(3-aminophenoxy)phenyl]methane, 1,1-bis-[4-(3-aminophenoxy)phenyl]ethane, 1,2-bis[4-(3-aminophenoxy)phenyl]ethane, 2,2-bis[4-(3-aminophenoxy)phenyl]propane, 2,2'-bis-[4-(3-aminophenoxy)phenyl]butane, 2,2-bis[4-(3-aminophenoxy)phenyl]-1,1,1,3,3,3-hexafluoropropane, 4,4'-bis(3-aminophenoxy)biphenyl, bis[4-(3-aminophenoxy)phenyl]ketone, bis[4-(3-aminophenoxy)phenyl]sulfide, bis[4-(3-aminophenoxy)phenyl]sulfoxide, bis[4-(3-aminophenoxy)phenyl]sulfone, and bis[4-(3-aminophenoxy)phenyl]ether.

7. The method according to claim 1, wherein the carboxylic acid-substituted aromatic dianhydride is 3,5-diaminobenzoic acid.

8. The method according to claim 1, wherein the steps (a) and (b) are carried out at a temperature of from ambient temperature to 90° C.

9. The method according to claim 1, wherein the step (c) is carried out at a temperature of from 120° C. to 200° C.

10. The method according to claim 1, wherein the coordination in the step (d) is carried out under the condition that mole ratio of [Ti]/[COOH] is more than 3.

11. The method according to claim 10, wherein the coordination in the step (d) is carried out under the condition that mole ratio of [Ti]/[COOH] is more than 8.

12. The method according to claim 1, wherein the condensation with titanium alkoxide in the step (d) is carried out in the presence of alkanol.

13. The method according to claim 12, wherein the alkanol has the carbon atom numbers the same as the alkoxide in the titanium alkoxide.

* * * * *